(12) United States Patent
Redeker et al.

(10) Patent No.: US 6,602,724 B2
(45) Date of Patent: Aug. 5, 2003

(54) CHEMICAL MECHANICAL POLISHING OF A METAL LAYER WITH POLISHING RATE MONITORING

(75) Inventors: Fred C. Redeker, Fremont, CA (US); Rajeev Bajaj, Fremont, CA (US)

(73) Assignee: Applied Materials, Inc., Santa Clara, CA (US)

(*) Notice: Subject to any disclaimer, the term of this patent is extended or adjusted under 35 U.S.C. 154(b) by 0 days.

(21) Appl. No.: 09/918,591

(22) Filed: Jul. 27, 2001

(65) Prior Publication Data

US 2002/0055192 A1 May 9, 2002

Related U.S. Application Data

(60) Provisional application No. 60/221,668, filed on Jul. 27, 2000.

(51) Int. Cl.⁷ .............................................. H01L 21/00
(52) U.S. Cl. ...................... 438/5; 438/7; 438/8; 438/10
(58) Field of Search ............................. 438/5, 7, 8, 10, 438/14, 16, 17

(56) References Cited

U.S. PATENT DOCUMENTS

| | | |
|---|---|---|
| 4,005,359 A | 1/1977 | Smoot |
| 4,112,365 A | 9/1978 | Larson et al. |
| 4,303,885 A | 12/1981 | Davis et al. |
| 4,467,281 A | 8/1984 | Davis et al. |
| 4,556,845 A | 12/1985 | Strope et al. |
| 4,715,007 A | 12/1987 | Fujita et al. |
| 4,716,366 A | 12/1987 | Hosoe et al. |
| 4,829,251 A | 5/1989 | Fischer |
| 5,003,262 A | 3/1991 | Egner et al. |
| 5,081,796 A | 1/1992 | Schultz |
| 5,213,655 A | 5/1993 | Leach et al. |
| 5,237,271 A | 8/1993 | Hedengren |
| 5,340,370 A | 8/1994 | Cadien |
| 5,343,146 A | 8/1994 | Koch et al. |
| 5,355,083 A | 10/1994 | George et al. |
| 5,357,331 A | 10/1994 | Flockencier |
| 5,413,941 A | 5/1995 | Koos et al. |
| 5,427,878 A | 6/1995 | Corliss |
| 5,433,651 A | 7/1995 | Lustig et al. |
| 5,541,510 A | 7/1996 | Danielson |
| 5,559,428 A | 9/1996 | Li et al. |
| 5,605,760 A | 2/1997 | Roberts |
| 5,609,511 A | 3/1997 | Moriyama et al. |
| 5,640,242 A | 6/1997 | O'Boyle et al. |
| 5,658,183 A | 8/1997 | Sandhu et al. |
| 5,660,672 A | 8/1997 | Li et al. |
| 5,663,797 A * | 9/1997 | Sandhu ........................ 438/16 |

(List continued on next page.)

FOREIGN PATENT DOCUMENTS

| | | | |
|---|---|---|---|
| EP | 0 460 348 A2 | 3/1992 | |
| EP | 0 663 265 A1 | 7/1995 | |
| EP | 0 738 561 A1 | 10/1996 | |
| EP | 0 881 040 A2 | 12/1998 | |
| EP | 0 881 484 A2 | 12/1998 | |
| EP | 1 116 552 A2 | 7/2001 | |
| JP | 3-234467 | 10/1991 | |
| WO | WO01/46684 | * 12/2000 | ................... 438/5 |

*Primary Examiner*—John F. Niebling
*Assistant Examiner*—Angel Roman
(74) *Attorney, Agent, or Firm*—Fish & Richardson

(57) ABSTRACT

A method of chemical mechanical polishing a metal layer on a substrate in which the substrate is polished at a first polishing rate. Polishing is monitored with an eddy current monitoring system, and the polishing rate is reduced to a second polishing rate when the eddy current monitoring system indicates that a predetermined thickness of the metal layer remains on the substrate. Then polishing is monitored with an optical monitoring system, and polishing is halted when the optical monitoring system indicates that an underlying layer is at least partially exposed.

14 Claims, 11 Drawing Sheets

U.S. PATENT DOCUMENTS

| | | | |
|---|---|---|---|
| 5,664,221 A | 9/1997 | Amberg et al. | |
| 5,672,091 A | 9/1997 | Takahashi et al. | |
| 5,676,587 A | 10/1997 | Landers | |
| RE35,703 E | 12/1997 | Koch et al. | |
| 5,708,506 A | 1/1998 | Birang | |
| 5,730,642 A | 3/1998 | Sandhu et al. | |
| 5,731,697 A | 3/1998 | Li et al. | |
| 5,733,171 A | 3/1998 | Allen et al. | |
| 5,762,537 A | 6/1998 | Sandhu et al. | |
| 5,791,969 A | 8/1998 | Lund | |
| 5,838,447 A | 11/1998 | Hiyama et al. | |
| 5,851,135 A | 12/1998 | Sandhu et al. | |
| 5,865,666 A | 2/1999 | Nagahara | |
| 5,872,633 A | 2/1999 | Holzapfel et al. | |
| 5,893,796 A | 4/1999 | Birang et al. | |
| 5,899,792 A | 5/1999 | Yagi | |
| 5,949,927 A | 9/1999 | Tang | |
| 5,964,643 A | 10/1999 | Birang et al. | |
| 6,004,187 A | 12/1999 | Nyui et al. | |
| 6,072,313 A * | 6/2000 | Li et al. | 216/86 |
| 6,159,073 A | 12/2000 | Wiswesser et al. | |
| 6,179,709 B1 | 1/2001 | Redeker et al. | |
| 6,190,234 B1 | 2/2001 | Swedek et al. | |
| 6,280,289 B1 | 8/2001 | Wiswesser et al. | |
| 6,296,548 B1 | 10/2001 | Wiswesser et al. | |
| 6,433,541 B1 * | 8/2002 | Lehman et al. | 324/202 |
| 2001/0008827 A1 * | 7/2001 | Kimura et al. | 451/8 |
| 2002/0013007 A1 * | 1/2002 | Hasegawa et al. | 438/8 |

* cited by examiner

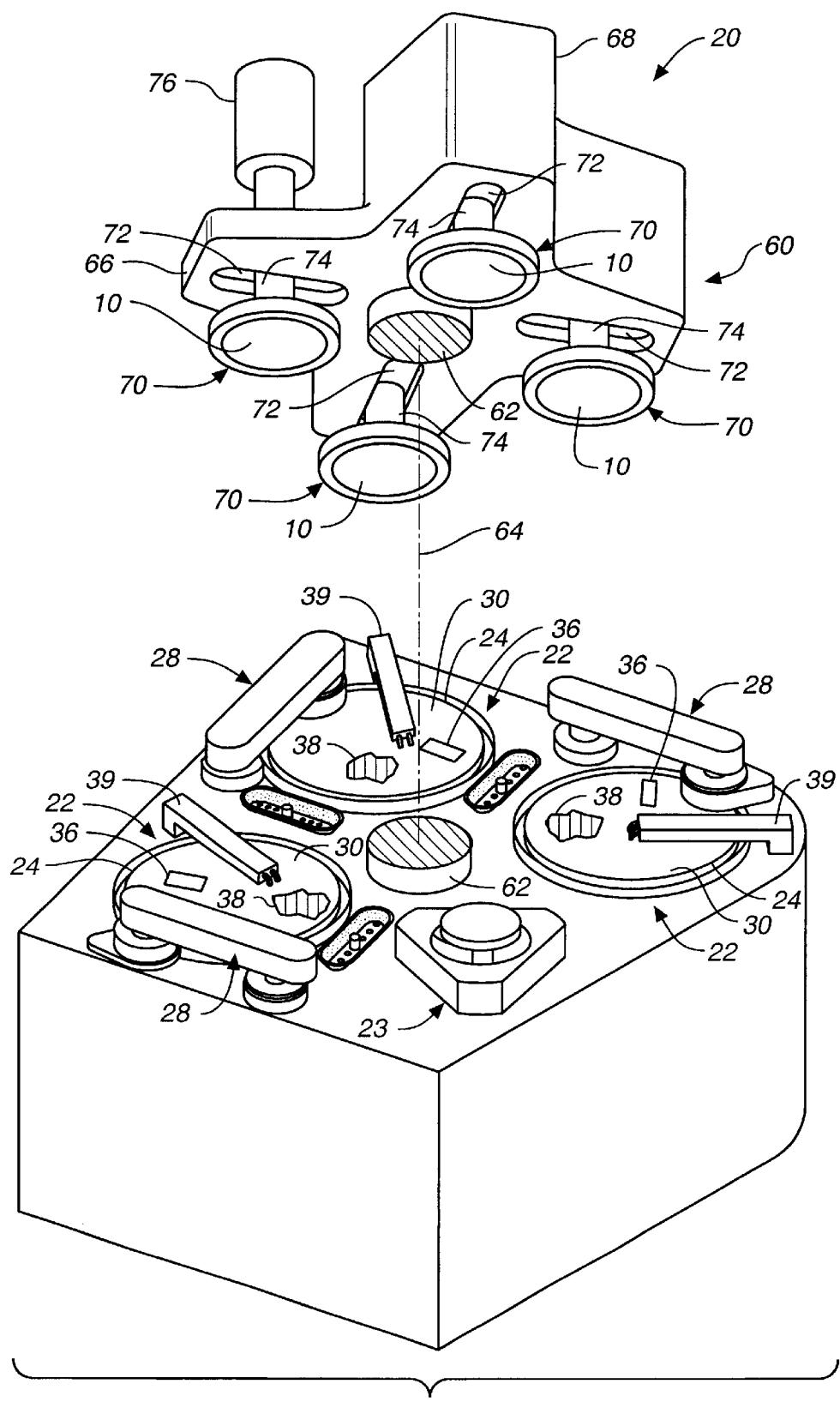
FIG. _1

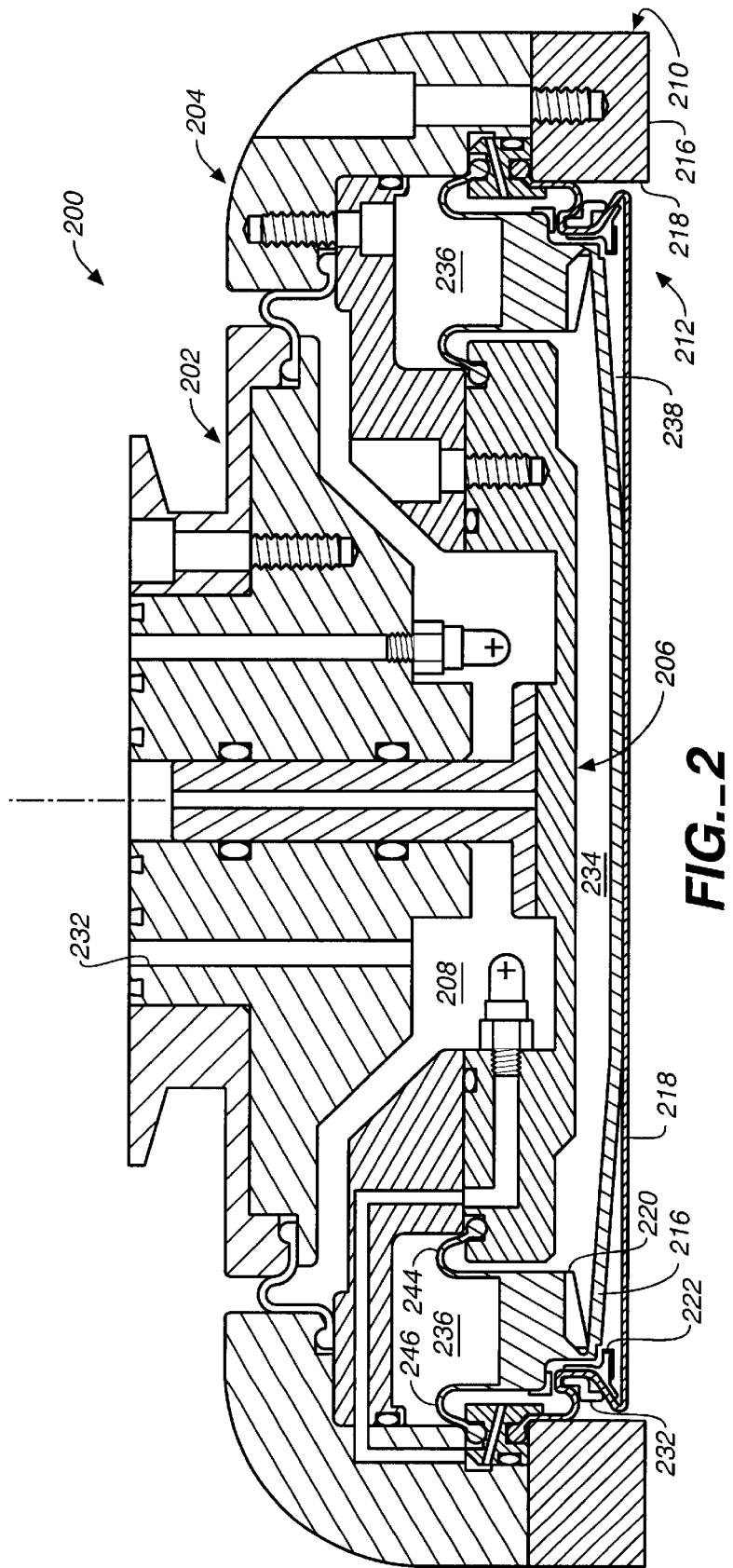
FIG._2

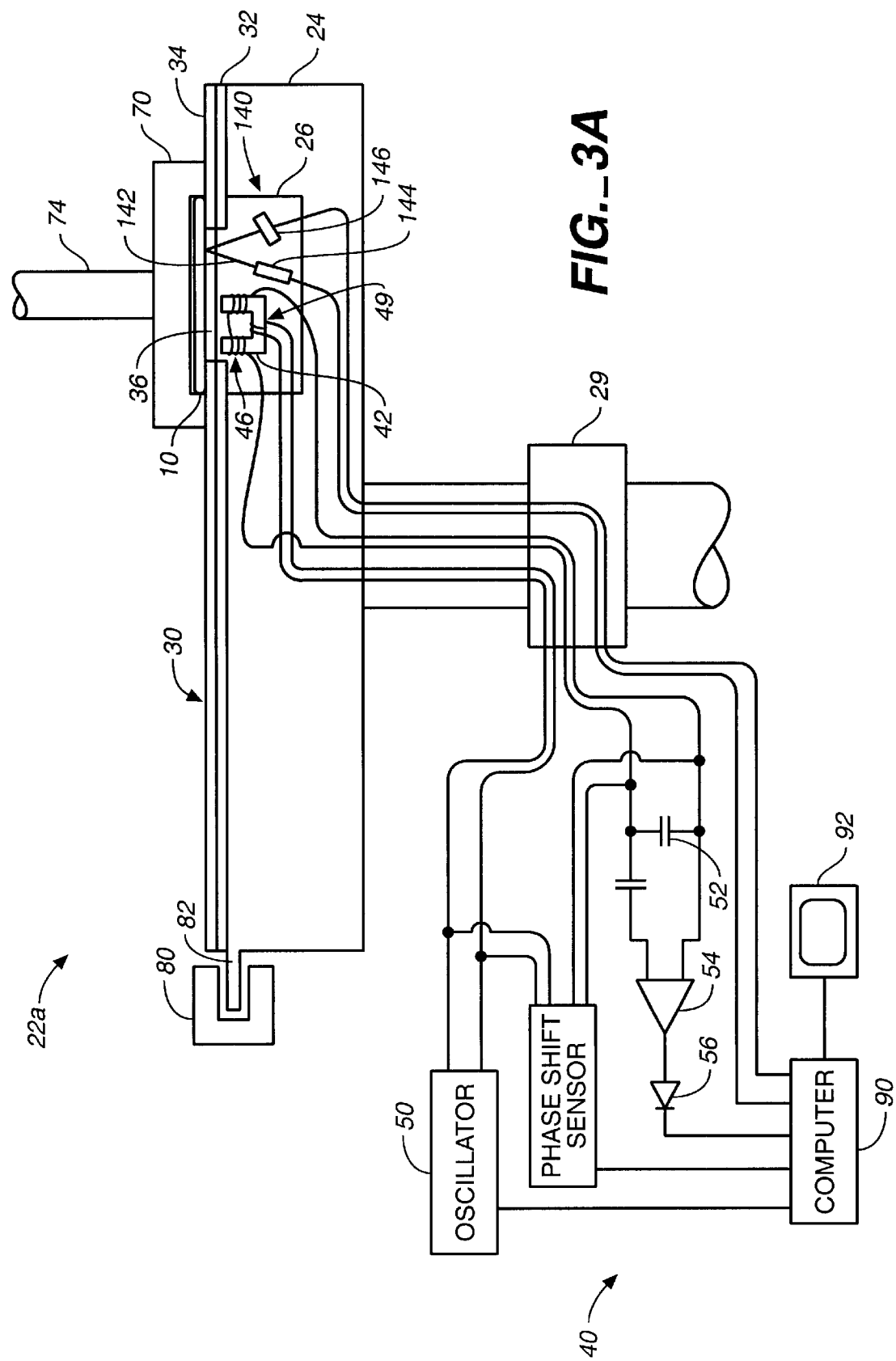

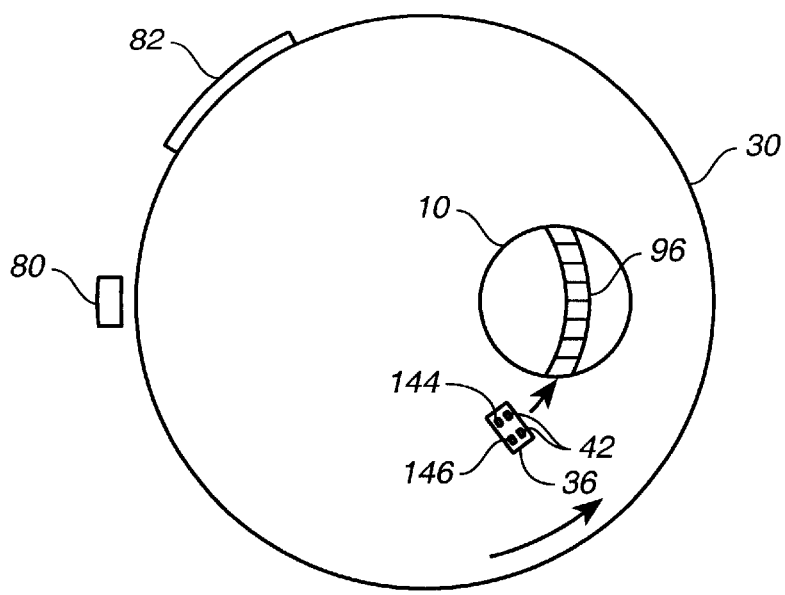
FIG._3B
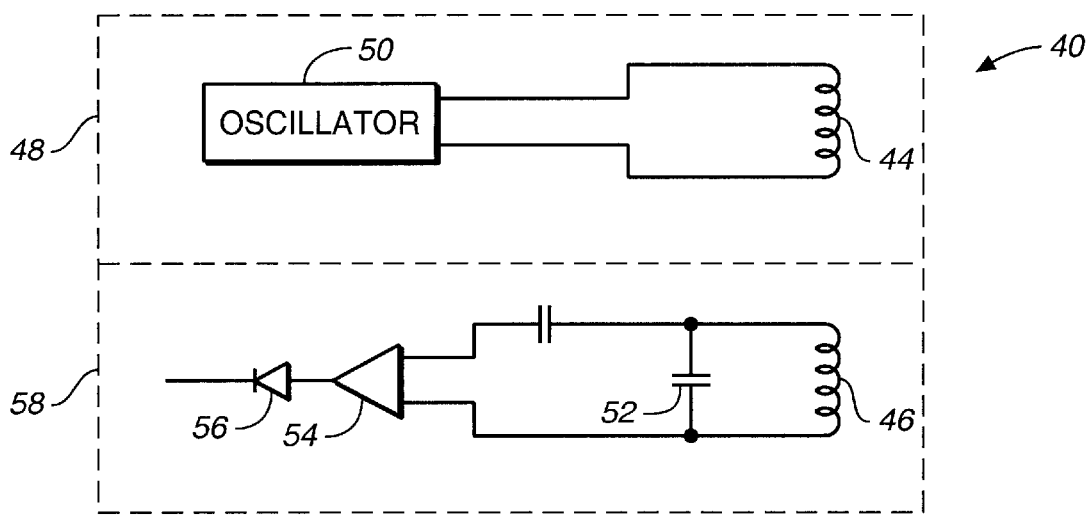
FIG._4

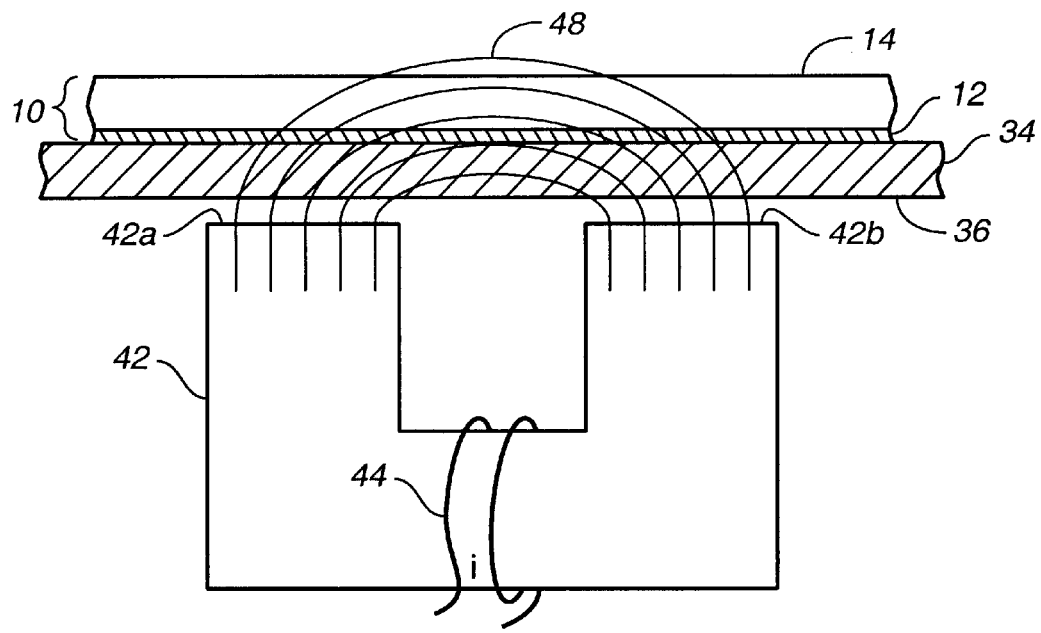
FIG._5
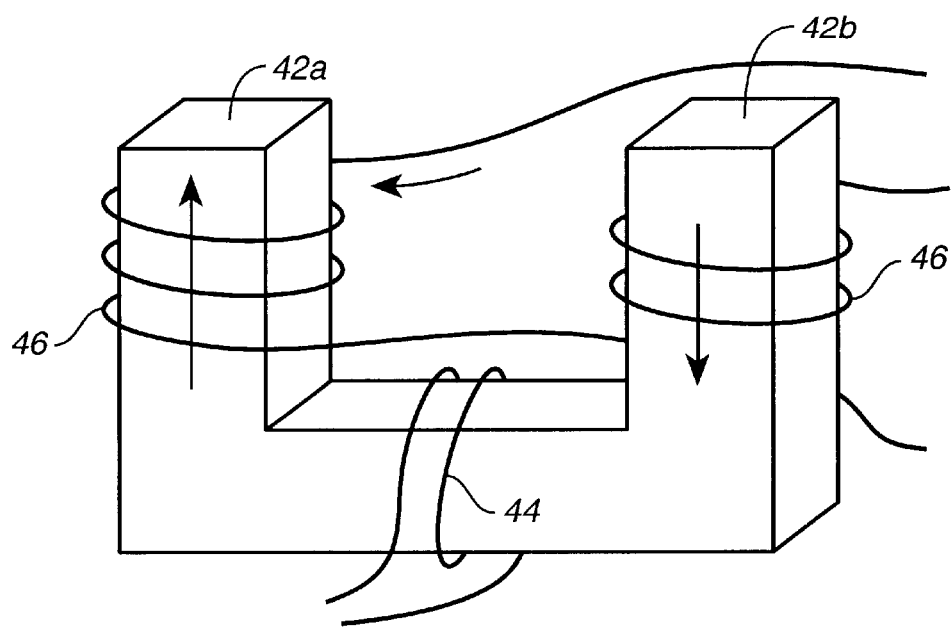
FIG._6

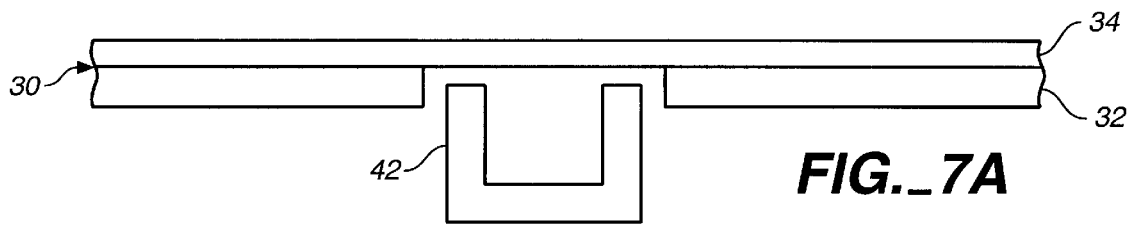
FIG._7A
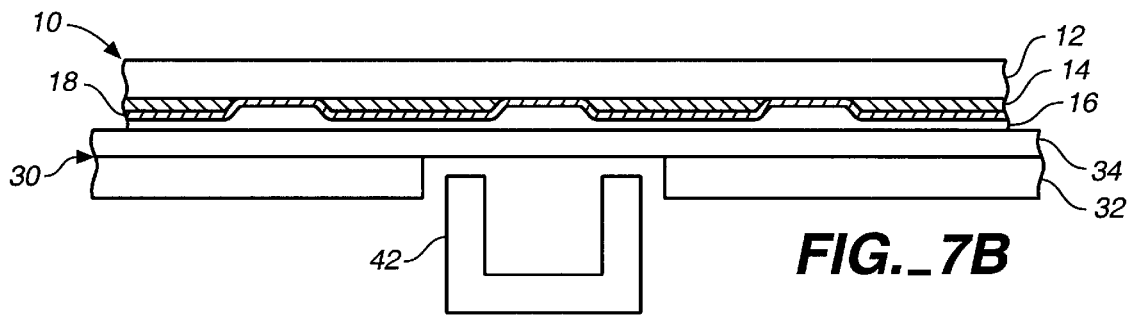
FIG._7B
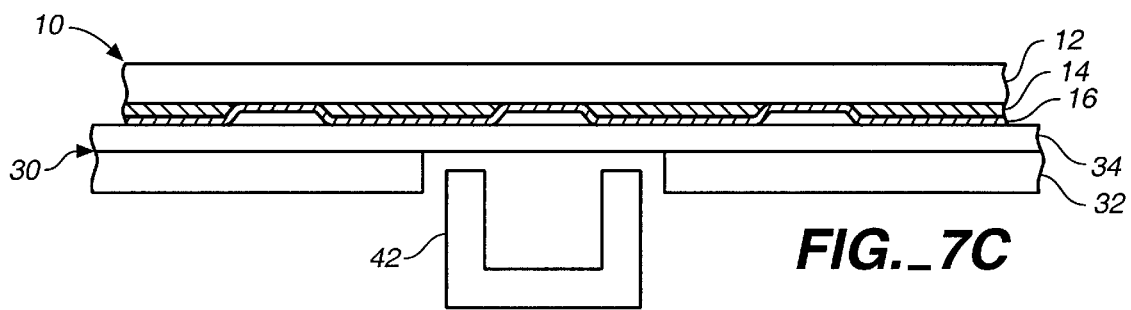
FIG._7C
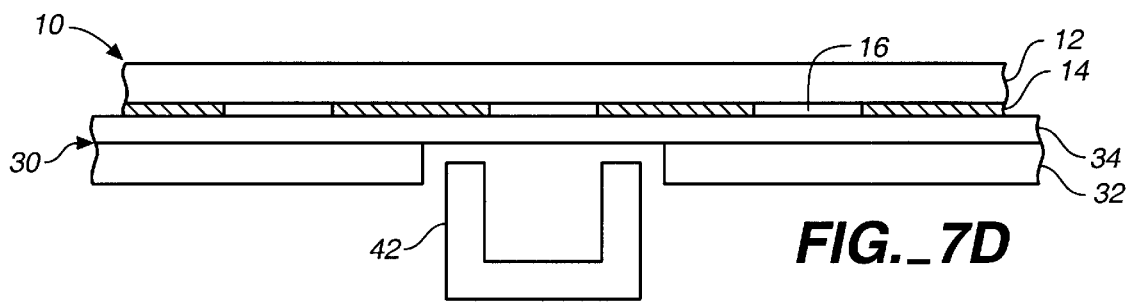
FIG._7D

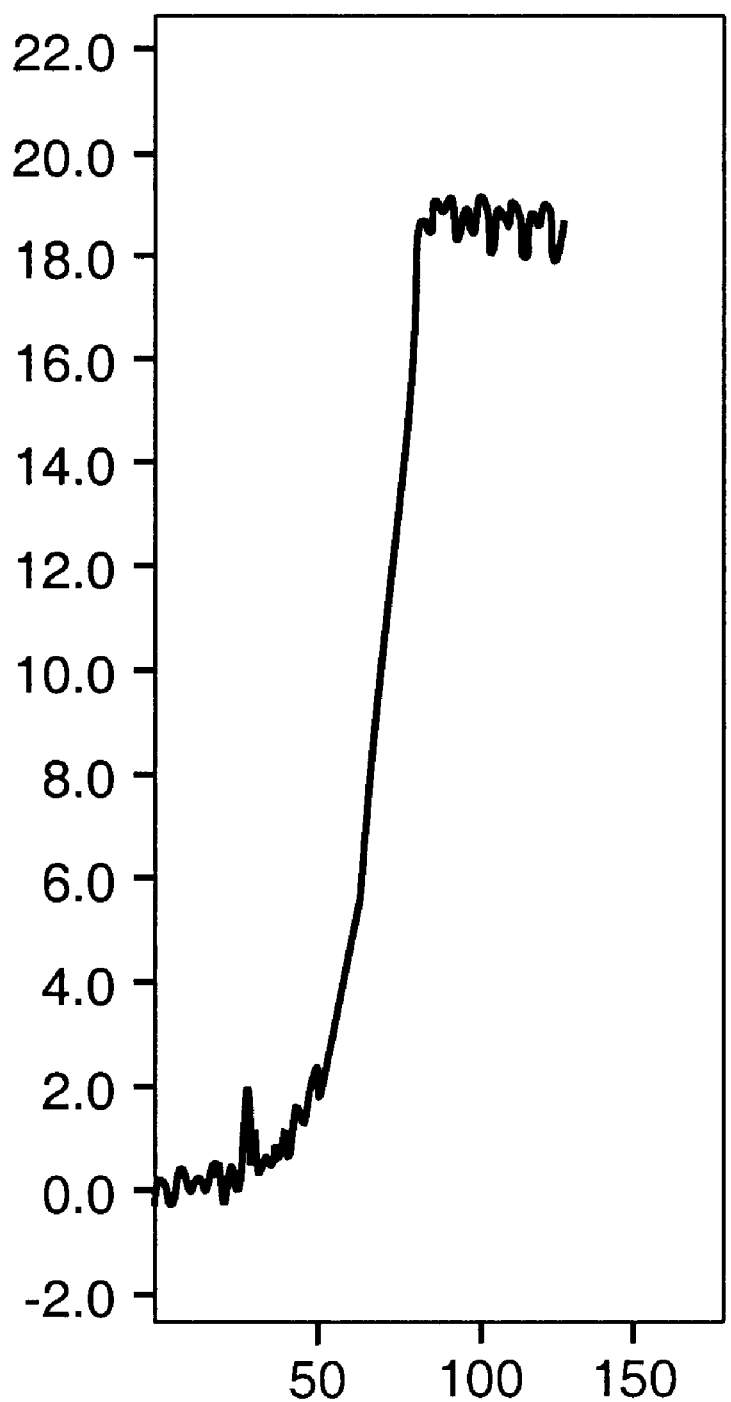
FIG._8

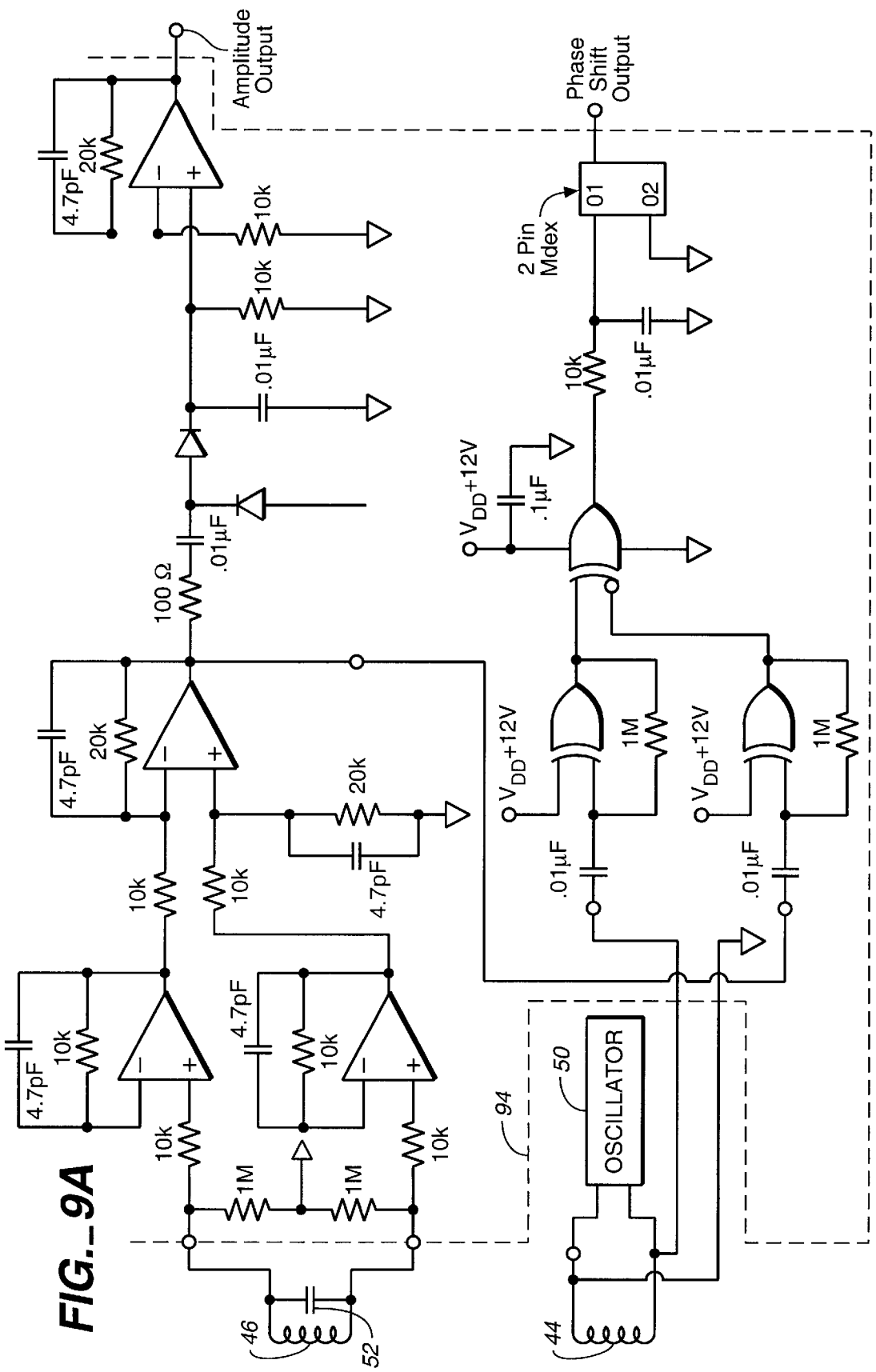
FIG._9A

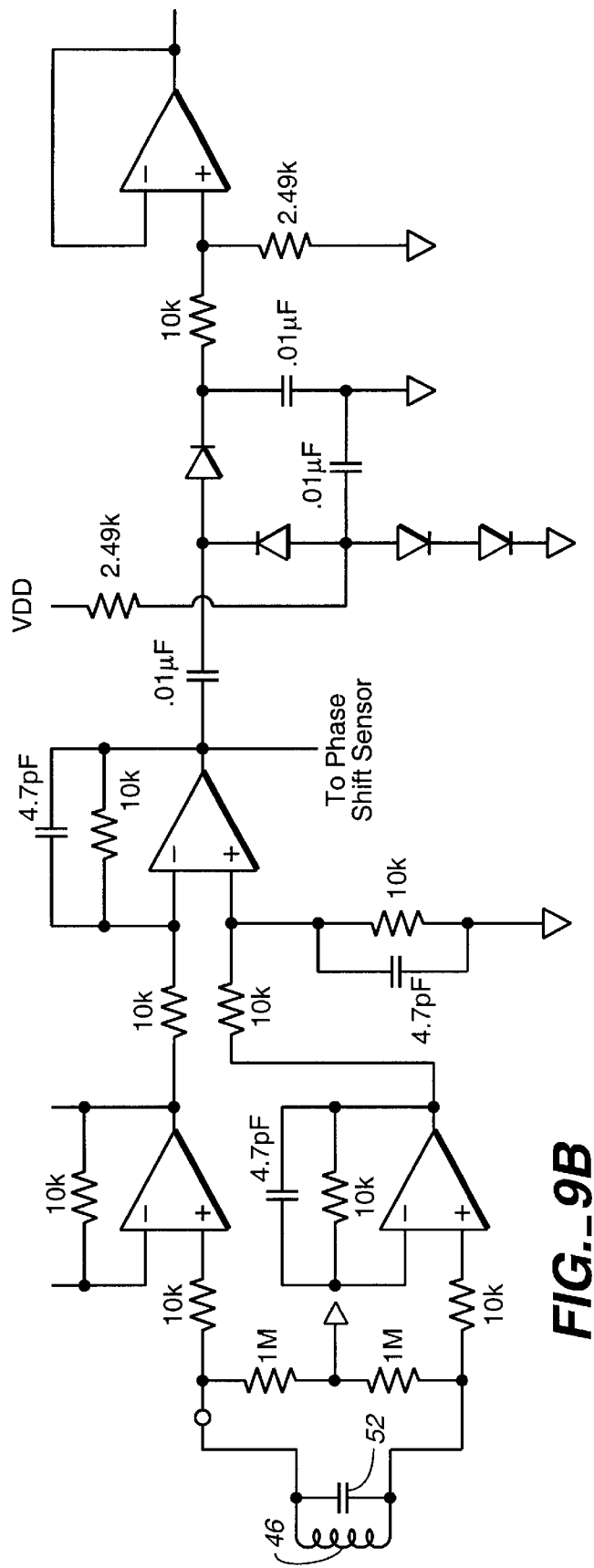
FIG._9B

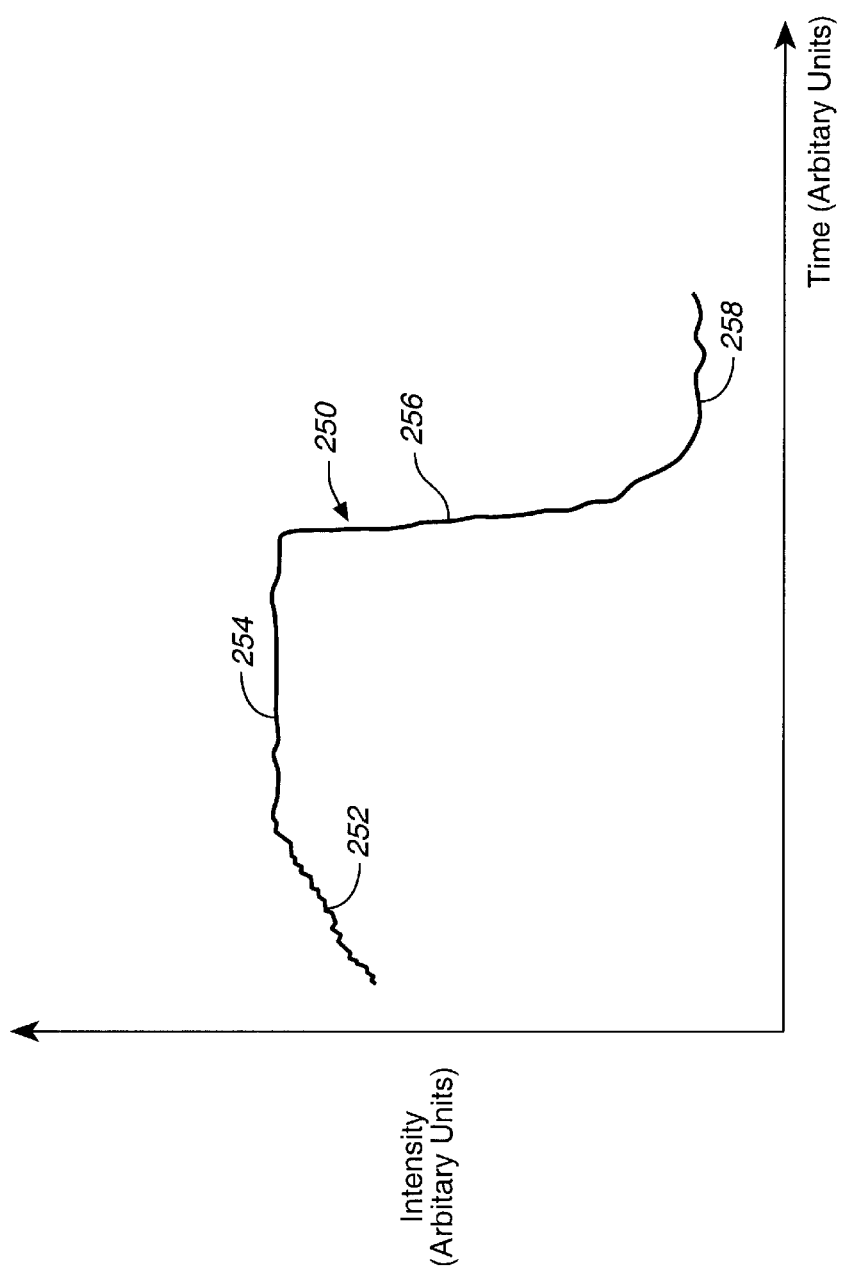
*FIG._11*
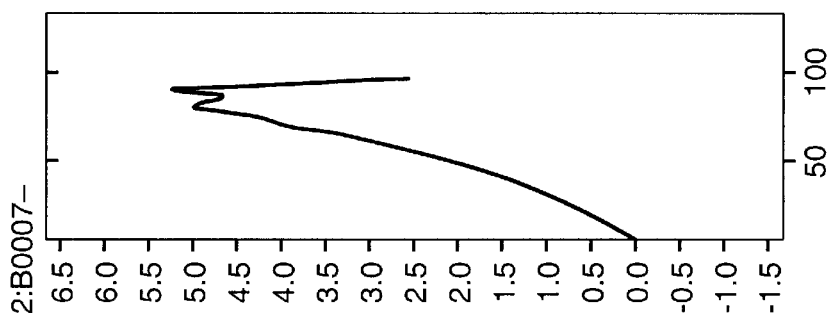
*FIG._10*

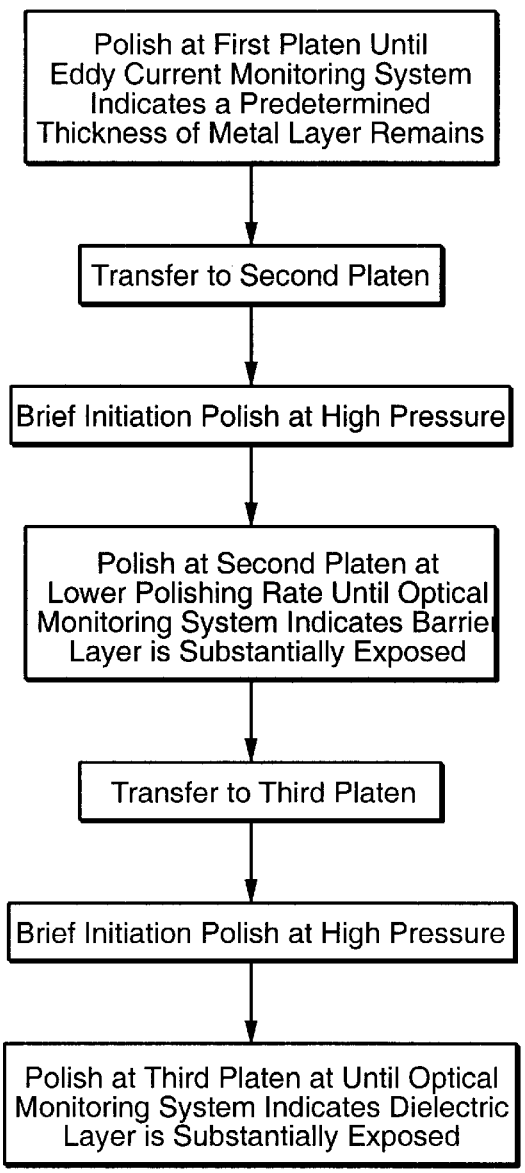
FIG._12
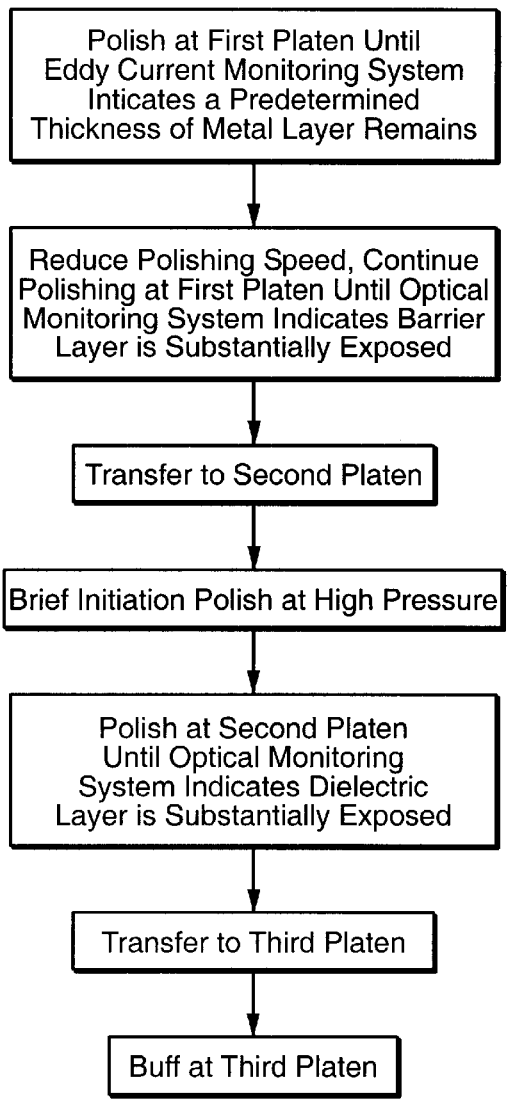
FIG._13

CHEMICAL MECHANICAL POLISHING OF A METAL LAYER WITH POLISHING RATE MONITORING

CROSS-REFERENCE TO RELATED APPLICATIONS

This application claims priority to Provisional U.S. Application Ser. No. 60/221,668, filed on Jul. 27, 2000.

BACKGROUND

The present invention relates generally to chemical mechanical polishing of substrates, and more particularly to methods and apparatus for monitoring a metal layer during chemical mechanical polishing.

An integrated circuit is typically formed on a substrate by the sequential deposition of conductive, semiconductive or insulative layers on a silicon wafer. One fabrication step involves depositing a filler layer over a non-planar surface, and planarizing the filler layer until the non-planar surface is exposed. For example, a conductive filler layer can be deposited on a patterned insulative layer to fill the trenches or holes in the insulative layer. The filler layer is then polished until the raised pattern of the insulative layer is exposed. After planarization, the portions of the conductive layer remaining between the raised pattern of the insulative layer form vias, plugs and lines that provide conductive paths between thin film circuits on the substrate. In addition, planarization is needed to planarize the substrate surface for photolithography.

Chemical mechanical polishing (CMP) is one accepted method of planarization. This planarization method typically requires that the substrate be mounted on a carrier or polishing head. The exposed surface of the substrate is placed against a rotating polishing disk pad or belt pad. The polishing pad can be either a "standard" pad or a fixed-abrasive pad. A standard pad has a durable roughened surface, whereas a fixed-abrasive pad has abrasive particles held in a containment media. The carrier head provides a controllable load on the substrate to push it against the polishing pad. A polishing slurry, including at least one chemically-reactive agent, and abrasive particles if a standard pad is used, is supplied to the surface of the polishing pad.

One problem in CMP is determining whether the polishing process is complete, i.e., whether a substrate layer has been planarized to a desired flatness or thickness, or when a desired amount of material has been removed. Overpolishing (removing too much) of a conductive layer or film leads to increased circuit resistance. On the other hand, underpolishing (removing too little) of a conductive layer leads to electrical shorting. Variations in the initial thickness of the substrate layer, the slurry composition, the polishing pad condition, the relative speed between the polishing pad and the substrate, and the load on the substrate can cause variations in the material removal rate. These variations cause variations in the time needed to reach the polishing endpoint. Therefore, the polishing endpoint cannot be determined merely as a function of polishing time.

One way to determine the polishing endpoint is to remove the substrate from the polishing surface and examine it. For example, the substrate can be transferred to a metrology station where the thickness of a substrate layer is measured, e.g., with a profilometer or a resistivity measurement. If the desired specifications are not met, the substrate is reloaded into the CMP apparatus for further processing. This is a timeconsuming procedure that reduces the throughput of the CMP apparatus. Alternatively, the examination might reveal that an excessive amount of material has been removed, rendering the substrate unusable.

More recently, in-situ monitoring of the substrate has been performed, e.g., with optical or capacitance sensors, in order to detect the polishing endpoint. Other proposed endpoint detection techniques have involved measurements of friction, motor current, slurry chemistry, acoustics and conductivity. One detection technique that has been considered is to induce an eddy current in the metal layer and measure the change in the eddy current as the metal layer is removed.

Another reoccurring problem in CMP is dishing of the substrate surface when polishing a filler layer to expose an underlying layer. Specifically, once the underlying layer is exposed, the portion of the filler layer located between the raised areas of the patterned underlying layer can be overpolished, creating concave depressions in the substrate surface. Dishing can render the substrate unsuitable for integrated circuit fabrication, thereby lowering process yield.

SUMMARY

In one aspect, the invention is directed to a method of chemical mechanical polishing a metal layer on a substrate. The substrate is polished at a first polishing station with a first polishing surface at a first polishing rate. Polishing at the first polishing station is monitored with an eddy current monitoring system, and the substrate is transferred to a second polishing station when the eddy current monitoring system indicates that a predetermined thickness of the metal layer remains on the substrate. The substrate is polished at the second polishing station with a second polishing surface at a second polishing rate that is lower than the first polishing rate. Polishing is monitored at the second polishing station with an optical monitoring system, polishing is halted when the optical monitoring system indicates that a first underlying layer is at least partially exposed.

Implementations of the invention may include one or more of the following features. The first underlying layer may be a barrier layer. The substrate may be transferred to a third polishing station and polished with a third polishing surface. Polishing at the third polishing station may be monitored with a second optical monitoring system, and polishing may be halted when the second optical monitoring system indicates that a second underlying layer is at least partially exposed. Polishing at the third polishing station may continue until the second underlying layer is substantially entirely exposed. Polishing at the second polishing station may continue until the first underlying layer is substantially entirely exposed. Polishing the substrate at the second polishing station may include an initiation polishing step at a higher pressure than the remaining polishing at the second polishing station.

In another aspect, the invention is directed to a method of chemical mechanical polishing a metal layer on a substrate. The substrate is polished at a first polishing station with a first polishing surface at a first polishing rate. Polishing at the first polishing station is monitored with an eddy current monitoring system, and the polishing rate at the first polishing station is reduced when the eddy current monitoring system indicates that a predetermined thickness of the metal layer remains on the substrate. Polishing at the first polishing station is monitored with an optical monitoring system, and polishing is halted when the optical monitoring system indicates that a first underlying layer is at least partially exposed.

Implementations of the invention may include one or more of the following features. The first underlying layer may be a barrier layer. The substrate may be transferred to a second polishing station and polished with a second polishing surface. Polishing at the second polishing station may be monitored with a second optical monitoring system, and polishing may be halted when the second optical monitoring system indicates that a second underlying layer is at least partially exposed. The substrate may be transferred to a third polishing station and buffed with a buffing surface. Polishing at the second polishing station may continue until the first underlying layer is substantially entirely exposed.

In another aspect, the invention is directed to a method of chemical mechanical polishing a metal layer on a substrate in which the substrate is polished at a first polishing rate. Polishing is monitored with an eddy current monitoring system, and the polishing rate is reduced when the eddy current monitoring system indicates that a predetermined thickness of the metal layer remains on the substrate. Polishing is monitored with an optical monitoring system, and polishing is halted when the optical monitoring system indicates that an underlying layer is at least partially exposed.

Possible advantages of implementations of the invention can include one or more of the following. During bulk polishing of the metal layer, the pressure profile applied by the carrier head can be adjusted to compensate for non-uniform polishing rates and non-uniform thickness of the incoming substrate. In addition, the polishing monitoring system can sense the polishing endpoint of a metal layer in-situ. Furthermore, the polishing monitoring system can determine the point at which the polishing apparatus should switch polishing parameters. For example, the polishing monitoring system can be used to trigger a polishing rate slowdown during polishing of a metal layer prior to the polishing endpoint. Polishing can be stopped with high accuracy. Overpolishing and underpolishing can be reduced, as can dishing and erosion, thereby improving yield and throughput.

Other features and advantages of the invention will become apparent from the following description, including the drawings and claims.

BRIEF DESCRIPTION OF THE DRAWINGS

FIG. 1 is a schematic exploded perspective view of a chemical mechanical polishing apparatus.

FIG. 2 is a schematic cross-sectional view of a carrier head.

FIG. 3A is a schematic side view, partially cross-sectional, of a chemical mechanical polishing station that includes an eddy current monitoring system and an optical monitoring system.

FIG. 3B is a schematic top view of a platen from the polishing station of FIG. 3A.

FIG. 4 is a schematic circuit diagram of the eddy current monitoring system.

FIG. 5 is a schematic cross-sectional view illustrating a magnetic field generated by the eddy current monitoring system.

FIG. 6 is a schematic perspective view of a core from an eddy current sensor.

FIGS. 7A–7D schematically illustrate a method of detecting a polishing endpoint using an eddy current sensor.

FIG. 8 is a graph illustrating an amplitude trace from the eddy current monitoring system.

FIGS. 9A and 9B are schematic circuit diagrams of two implementations of an eddy current monitoring system that sense a phase shift.

FIG. 10 is a graph illustrating a phase shift trace from the eddy current monitoring system.

FIG. 11 is a graph illustrating an amplitude trace from the optical monitoring system.

FIG. 12 is a flowchart illustrating a method of polishing a metal layer.

FIG. 13 is a flowchart illustrating an alternative method of polishing a metal layer.

DETAILED DESCRIPTION

Referring to FIG. 1, one or more substrates 10 can be polished by a CMP apparatus 20. A description of a similar polishing apparatus 20 can be found in U.S. Pat. No. 5,738,574, the entire disclosure of which is incorporated herein by reference. Polishing apparatus 20 includes a series of polishing stations 22a, 22b and 22c, and a transfer station 23. Transfer station 23 transfers the substrates between the carrier heads and a loading apparatus.

Each polishing station includes a rotatable platen 24 on which is placed a polishing pad 30. The first and second stations 22a and 22b can include a two-layer polishing pad with a hard durable outer surface or a fixed-abrasive pad with embedded abrasive particles. The final polishing station 22c can include a relatively soft pad or a two-layer pad. Each polishing station can also include a pad conditioner apparatus 28 to maintain the condition of the polishing pad so that it will effectively polish substrates.

Referring to FIG. 3A, a two-layer polishing pad 30 typically has a backing layer 32 which abuts the surface of platen 24 and a covering layer 34 which is used to polish substrate 10. Covering layer 34 is typically harder than backing layer 32. However, some pads have only a covering layer and no backing layer. Covering layer 34 can be composed of foamed or cast polyurethane, possibly with fillers, e.g., hollow microspheres, and/or a grooved surface. Backing layer 32 can be composed of compressed felt fibers leached with urethane. A two-layer polishing pad, with the covering layer composed of IC-1000 and the backing layer composed of SUBA-4, is available from Rodel, Inc., of Newark, Del. (IC-1000 and SUBA-4 are product names of Rodel, Inc.).

During a polishing step, a slurry 38 containing a liquid (e.g., deionized water for oxide polishing) and a pH adjuster (e.g., potassium hydroxide for oxide polishing) can be supplied to the surface of polishing pad 30 by a slurry supply port or combined slurry/rinse arm 39. If polishing pad 30 is a standard pad, slurry 38 can also include abrasive particles (e.g., silicon dioxide for oxide polishing).

Returning to FIG. 1, a rotatable multi-head carousel 60 supports four carrier heads 70. The carousel is rotated by a central post 62 about a carousel axis 64 by a carousel motor assembly (not shown) to orbit the carrier head systems and the substrates attached thereto between polishing stations 22 and transfer station 23. Three of the carrier head systems receive and hold substrates, and polish them by pressing them against the polishing pads. Meanwhile, one of the carrier head systems receives a substrate from and delivers a substrate to transfer station 23.

Each carrier head 70 is connected by a carrier drive shaft 74 to a carrier head rotation motor 76 (shown by the removal of one quarter of cover 68) so that each carrier head can independently rotate about it own axis. In addition, each carrier head 70 independently laterally oscillates in a radial slot 72 formed in carousel support plate 66. A description of a suitable carrier head 70 can be found in U.S. patent application Ser. Nos. 09/470,820 and 09/535,575, filed Dec. 23, 1999 and Mar. 27, 2000, the entire disclosures of which are incorporated by reference. In operation, the platen is rotated about its central axis 25, and the carrier head is rotated about its central axis 71 and translated laterally across the surface of the polishing pad.

As disclosed in the foregoing patent application and as shown in FIG. 3, an exemplary carrier head 70 includes a housing 202, a base assembly 204, a gimbal mechanism 206 (which can be considered part of the base assembly 204), a loading chamber 208, a retaining ring 210, and a substrate backing assembly 212 which includes three pressurizable chambers, such as a floating upper chamber 236, a floating lower chamber 234, and an outer chamber 238. The loading chamber 208 is located between the housing 202 and the base assembly 204 to apply a load to and to control the vertical position of the base assembly 204. A first pressure regulator (not shown) can be fluidly connected to the loading chamber 208 by a passage 232 to control the pressure in the loading chamber and the vertical position of base assembly 204.

The substrate backing assembly 212 includes a flexible internal membrane 216, a flexible external membrane 218, an internal support structure 220, an external support structure 230, an internal spacer ring 222 and an external spacer ring 232. The flexible internal membrane 216 includes a central portion which applies pressure to the wafer 10 in a controllable area. The volume between the base assembly 204 and the internal membrane 216 that is sealed by an inner flap 244 provides the pressurizable floating lower chamber 234. The annular volume between the base assembly 204 and the internal membrane 216 that is sealed by the inner flap 244 and outer flap 246 defines the pressurizable floating upper chamber 236. The sealed volume between the internal membrane 216 and the external membrane 218 defines a pressurizable outer chamber 238. Three pressure regulators (not shown) can be independently connected to the floating lower chamber 234, the floating upper chamber 236 and the outer chamber 238. Thus, a fluid such as a gas can be directed into or out of each chamber independently.

The combination of pressures in the floating upper chamber 236, the floating lower chamber 234 and the outer chamber 238 control both the contact area and the pressure of the internal membrane 216 against a top surface of the external membrane 218. For example, by pumping fluid out of the floating upper chamber 236, the edge of the internal membrane 216 is lifted away from the external membrane 218, thereby decreasing the contact diameter $D_C$ of the contact area between the internal membrane and external membrane. Conversely, by pumping fluid into the floating upper chamber 236, the edge of the internal membrane 216 is lowered toward the external membrane 218, thereby increasing the contact diameter $D_C$ of the contact area. In addition, by pumping fluid into or out of the floating lower chamber 234, the pressure of the internal membrane 216 against the external membrane 218. Thus, but the pressure in and the diameter of the area loaded by the carrier head can be controlled.

Referring to FIGS. 3A and 3B, a recess 26 is formed in platen 24, and a transparent section 36 is formed in polishing pad 30 overlying recess 26. Aperture 26 and transparent section 36 are positioned such that they pass beneath substrate 10 during a portion of the platen's rotation, regardless of the translational position of the carrier head. Assuming that polishing pad 32 is a two-layer pad, thin pad section 36 can be constructed by removing a portion of backing layer 32 and inserting a transparent plug 36 into the cover layer 34. The plug 36 can be a relatively pure polymer or polyurethane, e.g., formed without fillers. In general, the material of transparent section 36 should be non-magnetic and non-conductive.

Referring to FIGS. 3A and 4, the first polishing station 22a includes an in-situ eddy current monitoring system 40 and an optical monitoring system 140. The eddy current monitoring system 40 and optical monitoring system 140 can function as a polishing process control and endpoint detection system. The second polishing station 22b and the final polishing station 22c can both include just an optical monitoring system, although either may additionally include an eddy current monitoring system.

The eddy current monitoring system 40 includes a drive system 48 to induce eddy currents in a metal layer on the substrate and a sensing system 58 to detect eddy currents induced in the metal layer by the drive system. The monitoring system 40 includes a core 42 positioned in recess 26 to rotate with the platen, a drive coil 44 wound around one part of core 42, and a sense coil 46 wound around second part of core 42. For drive system 48, monitoring system 40 includes an oscillator 50 connected to drive coil 44. For sense system 58, monitoring system 40 includes a capacitor 52 connected in parallel with sense coil 46, an RF amplifier 54 connected to sense coil 46, and a diode 56. The oscillator 50, capacitor 52, RF amplifier 54, and diode 56 can be located apart from platen 24, and can be coupled to the components in the platen through a rotary electrical union 29.

Referring to FIG. 5, in operation the oscillator 50 drives drive coil 44 to generate an oscillating magnetic field 48 that extends through the body of core 42 and into the gap 46 between the two poles 42a and 42b of the core. At least a portion of magnetic field 48 extends through thin portion 36 of polishing pad 30 and into substrate 10. If a metal layer 12 is present on substrate 10, oscillating magnetic field 48 generates eddy currents in the metal layer 12. The eddy currents cause the metal layer 12 to act as an impedance source in parallel with sense coil 46 and capacitor 52. As the thickness of the metal layer changes, the impedance changes, resulting in a change in the Q-factor of sensing mechanism. By detecting the change in the Q-factor of the sensing mechanism, the eddy current sensor can sense the change in the strength of the eddy currents, and thus the change in thickness of metal layer 12.

Referring to FIG. 6, core 42 can be a U-shaped body formed of a non-conductive material with a relatively high magnetic permeability (e.g., $\mu$ of about 2500). Specifically, core 42 can be ferrite. In one implementation, the two poles 42a and 42b are about 0.6 inches apart, the core is about 0.6 inches deep, and the cross-section of the core is a square about 0.2 inches on a side.

In general, the in-situ eddy current monitoring system 40 is constructed with a resonant frequency of about 50 kHz to 10 MHz, e.g., 2 MHz. For example, the sense coil 46 can have an inductance of about 0.3 to 30 microH and the capacitor 52 can have a capacitance of about 0.2 to 20 nF. The driving coil can be designed to match the driving signal from the oscillator. For example, if the oscillator has a low voltage and a low impedance, the drive coil can include fewer turns to provide a small inductance. On the other hand, if the oscillator has a high voltage and a high impedance, the drive coil can include more turns to provide a large inductance.

In one implementation, the sense coil 46 includes nine turns around each prong of the core, and the drive coil 44 includes two turns around the base of the core, and the oscillator drives the drive coil 44 with an amplitude of about 0.1 V to 5.0 V. Also, in one implementation, the sense coil 46 has an inductance of about 2.8 microH, the capacitor 52 has a capacitance of about 2.2 nF, and the resonant frequency is about 2 MHz. In another implementation, the sense coil has an inductance of about 3 microH and the capacitor 52 has a capacitance of about 400 pF. Of course, these values are merely exemplary, as they are highly sensitive to the exact winding configuration, core composition and shape, and capacitor size.

In general, the greater the expected initial thickness of the conductive film, the lower the desired resonant frequency. For example, for a relatively thin film, e.g., 2000 Angstroms, the capacitance and inductance can be selected to provide a relatively high resonant frequency, e.g., about 2 MHz. On the other hand, for a relatively thicker film, e.g., 20000 Angstroms, the capacitance and inductance can be selected to provide a relatively lower resonant frequency, e.g., about 50 kHz. However, high resonant frequencies may still work well with thick copper layers. In addition, very high frequencies (above 2 MHz) can be used to reduce background noise from metal parts in the carrier head.

Initially, referring to FIGS. 3A, 4 and 7A, before conducting polishing, oscillator 50 is tuned to the resonant frequency of the LC circuit, without any substrate present. This resonant frequency results in the maximum amplitude of the output signal from RF amplifier 54.

As shown in FIGS. 7B and 8, for a polishing operation, a substrate 10 is placed in contact with polishing pad 30. Substrate 10 can include a silicon wafer 12 and a conductive layer 16, e.g., a metal such as copper, disposed over one or more patterned underlying layers 14, which can be semiconductor, conductor or insulator layers. A barrier layer 18, such as tantalum or tantalum nitride, may separate the metal layer from the underlying dielectric. The patterned underlying layers can include metal features, e.g., vias, pads and interconnects. Since, prior to polishing, the bulk of conductive layer 16 is initially relatively thick and continuous, it has a low resistivity, and relatively strong eddy currents can be generated in the conductive layer. As previously mentioned, the eddy currents cause the metal layer to function as an impedance source in parallel with sense coil 46 and capacitor 52. Consequently, the presence of conductive film 16 reduces the Q-factor of the sensor circuit, thereby significantly reducing the amplitude of the signal from RF amplifier 56.

Referring to FIGS. 7C and 8, as substrate 10 is polished, the bulk portion of conductive layer 16 is thinned. As the conductive layer 16 thins, its sheet resistivity increases, and the eddy currents in the metal layer become dampened. Consequently, the coupling between metal layer 16 and sensor circuitry 58 is reduced (i.e., increasing the resistivity of the virtual impedance source). As the coupling declines, the Q-factor of the sensor circuit 58 increases toward its original value.

Referring to FIGS. 7D and 8, eventually the bulk portion of conductive layer 16 is removed, leaving conductive interconnects 16' in the trenches between the patterned insulative layer 14. At this points, the coupling between the conductive portions in the substrate, which are generally small and generally non-continuous, and sensor circuit 58 reaches a minimum. Consequently, the Q-factor of the sensor circuit reaches a maximum value (although not as large as the Q-factor when the substrate is entirely absent). This causes the amplitude of the output signal from the sensor circuit to plateau.

In addition to sensing changes in amplitude, the eddy current monitoring system can calculate a phase shift in the sensed signal. As the metal layer is polished, the phase of the sensed signal changes relative to the drive signal from the oscillator 50. This phase difference can be correlated to the thickness of the polished layer. One implementation of a phase measuring device, shown in FIG. 9A, combines the drive and sense signals to generate a phase shift signal with a pulse width or duty cycle which is proportional to the phase difference. In this implementation, two XOR gates 100 and 102 are used to convert sinusoidal signals from the sense coil 46 and oscillator 50, respectively, into square-wave signals. The two square-wave signals are fed into the inputs of a third XOR gate 104. The output of the third XOR gate 104 is a phase shift signal with a pulse width or duty cycle proportional to the phase difference between the two square wave signals. The phase shift signal is filtered by an RC filter 106 to generate a DC-like signal with a voltage proportional to the phase difference. Alternatively, the signals can be fed into a programmable digital logic, e.g., a Complex Programmable Logic Device (CPLD) or Field Programmable Gate Array (FGPA) that performs the phase shift measurements.

An implementation for both the amplitude and phase shift portions of the eddy current monitoring system is shown in FIG. 9A. An implementation of the amplitude sensing portion of the eddy current monitoring system is shown in FIG. 9B. An example of a trace generated by an eddy current monitoring system that measures the phase difference between the drive and sense signals is shown in FIG. 10. Since the phase measurements are highly sensitive to the stability of the driving frequency, phase locked loop electronics may be added.

A possible advantage of the phase difference measurement is that the dependence of the phase difference on the metal layer thickness may be more linear than that of the amplitude. In addition, the absolute thickness of the metal layer may be determined over a wide range of possible thicknesses.

Returning to FIG. 3A, the optical monitoring system 140, which can function as a reflectometer or interferometer, can be secured to platen 24 in recess 26 adjacent the eddy current monitoring system 40. Thus, the optical monitoring system 140 can measure the reflectivity of substantially the same location on the substrate as is being monitored by the eddy current monitoring system 40. Specifically, the optical monitoring system 140 can be positioned to measure a portion of the substrate at the same radial distance from the axis of rotation of the platen 24 as the eddy current monitoring system 40. Thus, the optical monitoring system 140 can sweep across the substrate in the same path as the eddy current monitoring system 40.

The optical monitoring system 140 includes a light source 144 and a detector 146. The light source generates a light beam 142 which propagates through transparent window section 36 and slurry to impinge upon the exposed surface of the substrate 10. For example, the light source 144 may be a laser and the light beam 142 may be a collimated laser beam. The light laser beam 142 can be projected from the laser 144 at an angle a from an axis normal to the surface of the substrate 10. In addition, if the hole 26 and the window 36 are elongated, a beam expander (not illustrated) may be positioned in the path of the light beam to expand the light beam along the elongated axis of the window. In general, the optical monitoring system functions as described in U.S. patent application Ser. No. 09/184,775, filed Nov. 2, 1998, and Ser. No. 09/184,767, filed Nov. 2, 1998, the entire disclosures of which are incorporated herein by references.

An example of a trace 250 generated by an optical monitoring system that measures the phase difference between the drive and sense signals is shown in FIG. 11. The overall shape of intensity trace 250 may be explained as follows. Initially, the metal layer 16 has some initial topography because of the topology of the underlying patterned layer 14. Due to this topography, the light beam scatters when it impinges the metal layer. As the polishing operation progresses in section 252 of the trace, the metal layer becomes more planar and the reflectivity of the polished metal layer increases. As the bulk of the metal layer is removed in section 254 of the trace, the intensity remains relatively stable. Once the oxide layer begins to be exposed in the trace, the overall signal strength drops quickly in section 256 of the trace. Once the oxide layer is entire exposed in the trace, the intensity stabilizes again in section 258 of the trace, although it may undergo small oscillations due to interferometric effects as the oxide layer is removed.

Returning to FIGS. 3A, 3B and 4, the CMP apparatus 20 can also include a position sensor 80, such as an optical interrupter, to sense when core 42 and light source 44 are beneath substrate 10. For example, the optical interrupter could be mounted at a fixed point opposite carrier head 70. A flag 82 is attached to the periphery of the platen. The point of attachment and length of flag 82 is selected so that it interrupts the optical signal of sensor 80 while transparent section 36 sweeps beneath substrate 10. Alternately, the CMP apparatus can include an encoder to determine the angular position of platen.

A general purpose programmable digital computer 90 receives the intensity signals and phase shift signals from the eddy current sensing system, and the intensity signals from the optical monitoring system. Since the monitoring systems sweep beneath the substrate with each rotation of the platen, information on the metal layer thickness and exposure of the underlying layer is accumulated in-situ and on a continuous real-time basis (once per platen rotation). The computer 90 can be programmed to sample measurements from the monitoring system when the substrate generally overlies the transparent section 36 (as determined by the position sensor). As polishing progresses, the reflectivity or thickness of the metal layer changes, and the sampled signals vary with time. The time varying sampled signals may be referred to as traces. The measurements from the monitoring systems can be displayed on an output device 92 during polishing to permit the operator of the device to visually monitor the progress of the polishing operation. In addition, as discussed below, the traces may be used to control the polishing process and determine the end-point of the metal layer polishing operation.

In operation, CMP apparatus 20 uses eddy current monitoring system 40 and optical monitoring system 140 to determine when the bulk of the filler layer has been removed and to determine when the underlying stop layer has been substantially exposed. The computer 90 applies process control and endpoint detection logic to the sampled signals to determine when to change process parameter and to detect the polishing endpoint. Possible process control and endpoint criteria for the detector logic include local minima or maxima, changes in slope, threshold values in amplitude or slope, or combinations thereof In addition, the computer 90 can be programmed to divide the measurements from both the eddy current monitoring system 40 and the optical monitoring system 140 from each sweep beneath the substrate into a plurality of sampling zones 96, to calculate the radial position of each sampling zone, to sort the amplitude measurements into radial ranges, to determine minimum, maximum and average measurements for each sampling zone, and to use multiple radial ranges to determine the polishing endpoint, as discussed in U.S. patent application Ser. No. 09/460,529, filed Dec. 13, 1999, the entirety of which is incorporated herein by reference.

Computer 48 may also be connected to the pressure mechanisms that control the pressure applied by carrier head 70, to carrier head rotation motor 76 to control the carrier head rotation rate, to the platen rotation motor (not shown) to control the platen rotation rate, or to slurry distribution system 39 to control the slurry composition supplied to the polishing pad. Specifically, after sorting the measurements into radial ranges, information on the metal film thickness can be fed in real-time into a closed-loop controller to periodically or continuously modify the polishing pressure profile applied by a carrier head, as discussed in U.S. patent application Ser. No. 09/609,426, filed Jul. 5, 2000, the entirety of which is incorporated herein by reference. For example, the computer could determine that the endpoint criteria have been satisfied for the outer radial ranges but not for the inner radial ranges. This would indicate that the underlying layer has been exposed in an annular outer area but not in an inner area of the substrate. In this case, the computer could reduce the diameter of the area in which pressure is applied so that pressure is applied only to the inner area of the substrate, thereby reducing dishing and erosion on the outer area of the substrate.

A method of polishing a metal layer, such as a copper layer, is shown in flowchart form in FIG. 12. First, the substrate is polished at the first polishing station 22a to remove the bulk of the metal layer. The polishing process is monitored by the eddy current monitoring system 40. When a predetermined thickness, e.g., 2000 Angstroms, of the copper layer 14 remains over the underlying barrier layer 16 (see FIG., the polishing process is halted and the substrate is transferred to the second polishing station 22b. This first polishing endpoint can be triggered when the phase shift signal exceeds an experimentally determined threshold value. Exemplary polishing parameters for the first polishing station include a platen rotation rate of 93 rpm, a carrier head pressure of about 3 psi, and an IC-1010 polishing pad. As polishing progresses at the first polishing station, the radial thickness information from the eddy current monitoring system 40 can be fed into a closed-loop feedback system to control the pressure and/or the loading area of the carrier head 200 on the substrate. The pressure of the retaining ring on the polishing pad may also be adjusted to adjust the polishing rate. This permits the carrier head to compensate for the non-uniformity in the polishing rate or for non-uniformity in the thickness of the metal layer of the incoming substrate. As a result, after polishing at the first polishing station, most of the metal layer has been removed and the surface of the metal layer remaining on the substrate is substantially planarized.

At the second polishing station 22b, the substrate is polished at a lower polishing rate than at the first polishing station. For example, the polishing rate is reduced by about a factor of 2 to 4, i.e., by about 50% to 75%. To reduce the polishing rate, the carrier head pressure can be reduced, the carrier head rotation rate can be reduced, the composition of the slurry can be changed to introduce a slower polishing slurry, and/or the platen rotation rate could be reduced. For example, the pressure on the substrate from the carrier head may be reduced by about 33% to 50%, and the platen rotation rate and carrier head rotation rate may both be reduced by about 50%. Exemplary polishing parameters for the second polishing station 22b include a platen rotation rate of 43 rpm, a carrier head pressure of about 2 psi, and an IC-1010 polishing pad.

Optionally, when the polishing begins at the second polishing station, the substrate may be briefly polished, e.g., for about 10 seconds, at a somewhat higher pressure, e.g., 3 psi, and rotation rate, e.g., 93 rpm. This initial polishing, which can be termed an "initiation" step, may be needed to remove native oxides formed on the metal layer or to compensate for ramp-up of the platen rotation rate and carrier head pressure so as to maintain the expected throughput.

The polishing process is monitored at the second polishing station 22b by an optical monitoring system. Polishing proceeds at the second polishing station 22b until the metal layer is removed and the underlying barrier layer is exposed. Of course, small portions of the metal layer can remain on the substrate, but the metal layer is substantially entirely removed. The optical monitoring system is useful for determining this endpoint, since it can detect the change in reflectivity as the barrier layer is exposed. Specifically, the endpoint for the second polishing station can be triggered when the amplitude or slope of the optical monitoring signal falls below an experimentally determined threshold value across all the radial ranges monitored by the computer. This indicates that the barrier metal layer has been removed across substantially all of the substrate. Of course, as polishing progresses at the second polishing station 22b, the reflectivity information from the optical monitoring system 40 can be fed into a closed-loop feedback system to control the pressure and/or the loading area of the carrier head 200 on the substrate to prevent the regions of the barrier layer that are exposed earliest from becoming overpolished.

By reducing the polishing rate before the barrier layer is exposed, dishing and erosion effects can be reduced. In addition, the relative reaction time of the polishing machine is improved, enabling the polishing machine to halt polishing and transfer to the third polishing station with less material removed after the final endpoint criterion is detected. Moreover, more intensity measurements can be collected near the expected polishing end time, thereby potentially improving the accuracy of the polishing endpoint calculation. However, by maintaining a high polishing rate throughout most of the polishing operation at the first polishing station, high throughput is achieved. Preferably, at least 75%, e.g., 80–90%, of the bulk polishing of the metal layer is completed before the carrier head pressure is reduced or other polishing parameters are changed.

Once the metal layer has been removed at the second polishing station 22b, the substrate is transferred to the third polishing station 22c for removal of the barrier layer. Exemplary polishing parameters for the second polishing station include a platen rotation rate of 103 rpm, a carrier head pressure of about 3 psi, and an IC-1010 polishing pad. Optionally, the substrate may be briefly polished with an initiation step, e.g., for about 5 seconds, at a somewhat higher pressure, e.g., 3 psi, and platen rotation rate, e.g., 103 rpm. The polishing process is monitored at the third polishing station 22c by an optical monitoring system, and proceeds until the barrier layer is substantially removed and the underlying dielectric layer is substantially exposed. The same slurry solution may be used at the first and second polishing stations, whereas another slurry solution may be used at the third polishing station.

An alternative method of polishing a metal layer, such as a copper layer, is shown in flowchart form in FIG. 13. This method is similar to the method shown in FIG. 12. However, both the fast polishing step and the slow polishing step are performed at the first polishing station 22a. Removal of the barrier layer is performed at the second polishing station 22b, and a buffing step is performed at the final polishing station 22c.

The eddy current and optical monitoring systems can be used in a variety of polishing systems. Either the polishing pad, or the carrier head, or both can move to provide relative motion between the polishing surface and the substrate. The polishing pad can be a circular (or some other shape) pad secured to the platen, a tape extending between supply and take-up rollers, or a continuous belt. The polishing pad can be affixed on a platen, incrementally advanced over a platen between polishing operations, or driven continuously over the platen during polishing. The pad can be secured to the platen during polishing, or there could be a fluid bearing between the platen and polishing pad during polishing. The polishing pad can be a standard (e.g., polyurethane with or without fillers) rough pad, a soft pad, or a fixed-abrasive pad. Rather than tuning when the substrate is absent, the drive frequency of the oscillator can be tuned to a resonant frequency with a polished or unpolished substrate present (with or without the carrier head), or to some other reference.

Although illustrated as positioned in the same hole, the optical monitoring system 140 could be positioned at a different location on the platen than the eddy current monitoring system 40. For example, the optical monitoring system 140 and eddy current monitoring system 40 could be positioned on opposite sides of the platen, so that they alternately scan the substrate surface.

Various aspects of the invention, such as placement of the coil on a side of the polishing surface opposite the substrate or the measurement of a phase difference, still apply if the eddy current sensor uses a single coil. In a single coil system, both the oscillator and the sense capacitor (and other sensor circuitry) are connected to the same coil.

The present invention has been described in terms of a preferred embodiment. The invention, however, is not limited to the embodiment depicted and described. Rather, the scope of the invention is defined by the appended claims.

What is claimed is:

1. A method of chemical mechanical polishing a metal layer on a substrate, comprising:

polishing the metal layer on the substrate at a first polishing station with a first polishing surface at a first polishing rate;

monitoring polishing at the first polishing station with an eddy current monitoring system;

transferring the substrate to a second polishing station when the eddy current monitoring system indicates that a predetermined thickness of the metal layer remains on the substrate;

polishing the metal layer on the substrate at the second polishing station with a second polishing surface at a second polishing rate that is lower than the first polishing rate;

monitoring polishing of the metal layer at the second polishing station with an optical monitoring system; and halting polishing when the optical monitoring system indicates that a first underlying layer is at least partially exposed.

2. The method of claim 1, wherein the first underlying layer is a barrier layer.

3. The method of claim 2, further comprising transferring the substrate to a third polishing station and polishing the substrate with a third polishing surface.

4. The method of claim 3, further comprising monitoring polishing at the third polishing station with a second optical monitoring system, and halting polishing when the second optical monitoring system indicates that a second underlying layer is at least partially exposed.

5. The method of claim 3, wherein polishing at the third polishing station continues until the second underlying layer is substantially entirely exposed.

6. The method of claim 1, wherein polishing at the second polishing station continues until the first underlying layer is substantially entirely exposed.

7. The method of claim 1, wherein polishing the substrate at the second polishing station includes an initiation polishing step at a higher pressure than the remaining polishing at the second polishing station.

8. A method of chemical mechanical polishing a metal layer on a substrate, comprising:

polishing the metal layer on the substrate at a first polishing station with a first polishing surface at a first polishing rate;

monitoring polishing at the first polishing station with an eddy current monitoring system;

reducing the polishing rate at the first polishing station when the eddy current monitoring system indicates that a predetermined thickness of the metal layer remains on the substrate;

monitoring polishing of the metal layer at the first polishing station with an optical monitoring system; and halting polishing when the optical monitoring system indicates that a first underlying layer is at least partially exposed.

9. The method of claim 8, wherein the first underlying layer is a barrier layer.

10. The method of claim 8, further comprising transferring the substrate to a second polishing station and polishing the substrate with a second polishing surface.

11. The method of claim 3, further comprising monitoring polishing at the second polishing station with a second optical monitoring system, and halting polishing when the second optical monitoring system indicates that a second underlying layer is at least partially exposed.

12. The method of claim 11, further comprising transferring the substrate to a third polishing station and buffing the substrate with a buffing surface.

13. The method of claim 11, wherein polishing at the second polishing station continues until the first underlying layer is substantially entirely exposed.

14. A method of chemical mechanical polishing a metal layer on a substrate, comprising:

polishing the metal layer on the substrate at a first polishing rate;

monitoring polishing with an eddy current monitoring system;

reducing the polishing rate when the eddy current monitoring system indicates that a predetermined thickness of the metal layer remains on the substrate;

monitoring polishing of the metal layer with an optical monitoring system; and halting polishing when the optical monitoring system indicates that an underlying layer is at least partially exposed.

* * * * *

UNITED STATES PATENT AND TRADEMARK OFFICE
CERTIFICATE OF CORRECTION

PATENT NO. : 6,602,724 B2 Page 1 of 1
APPLICATION NO. : 09/918591
DATED : August 5, 2003
INVENTOR(S) : Fred C. Redeker and Rajeev Bajaj It is certified that error appears in the above-identified patent and that said Letters Patent is hereby corrected as shown below:

Col. 14, line 9;
In claim 11, line 1, change "3" to --8--.

Signed and Sealed this

Thirtieth Day of January, 2007

JON W. DUDAS
*Director of the United States Patent and Trademark Office*